US009198109B2

(12) United States Patent
Schmidt et al.

(10) Patent No.: US 9,198,109 B2
(45) Date of Patent: Nov. 24, 2015

(54) SYSTEM AND METHOD FOR USING GEO-LOCATION AND A CENTRALIZED SPECTRUM MANAGEMENT DATABASE TO ENABLE SEAMLESS HANDOVER AND GEO-FENCING OF CHANNEL USAGE IN WIRELESS SYSTEMS

(71) Applicant: Spectrum Bridge, Inc., Lake Mary, FL (US)

(72) Inventors: Jeffrey C. Schmidt, Orlando, FL (US); Larry Koos, Sanford, FL (US); William Koos, Altamonte Springs, FL (US); Peter Stanforth, Winter Springs, FL (US)

(73) Assignee: Spectrum Bridge, Inc., Lake Mary, FL (US)

( * ) Notice: Subject to any disclaimer, the term of this patent is extended or adjusted under 35 U.S.C. 154(b) by 0 days.

(21) Appl. No.: 14/069,658

(22) Filed: Nov. 1, 2013

(65) Prior Publication Data

US 2014/0141784 A1 May 22, 2014

Related U.S. Application Data

(60) Provisional application No. 61/727,325, filed on Nov. 16, 2012.

(51) Int. Cl.
*H04W 4/00* (2009.01)
*H04W 36/00* (2009.01)
*H04W 36/32* (2009.01)

(52) U.S. Cl.
CPC .................................. *H04W 36/32* (2013.01)

(58) Field of Classification Search
None
See application file for complete search history.

(56) References Cited

U.S. PATENT DOCUMENTS

| 5,477,334 | A   | * | 12/1995 | Keswani et al. | 356/405 |
|-----------|-----|---|---------|----------------|---------|
| 8,023,883 | B1  |   | 9/2011  | Lee et al.     |         |
| 2006/0030333 | A1 |   | 2/2006  | Ward et al.    |         |
| 2008/0178226 | A1 | * | 7/2008  | Lee            | 725/68  |
| 2009/0209271 | A1 |   | 8/2009  | Reed et al.    |         |
| 2010/0048234 | A1 | * | 2/2010  | Singh          | 455/509 |
| 2011/0142019 | A1 |   | 6/2011  | Bharghavan et al. |     |
| 2011/0159876 | A1 |   | 6/2011  | Segall et al.  |         |
| 2012/0214521 | A1 |   | 8/2012  | Preston et al. |         |
| 2012/0265430 | A1 |   | 10/2012 | Weimann        |         |
| 2013/0079040 | A1 | * | 3/2013  | Charbit et al. | 455/458 |

OTHER PUBLICATIONS

International Search Report and Written Opinion for corresponding International Application PCT/US13/68029, dated Jan. 14, 2014.

* cited by examiner

*Primary Examiner* — Marivelisse Santiago Cordero
*Assistant Examiner* — Moustapha Diaby
(74) *Attorney, Agent, or Firm* — Tucker Ellis LLP

(57) ABSTRACT

A system for channel handover includes a mobile radio device and a server storing polygon operating area information for a plurality of overlapping polygon operating areas for wireless communication. The mobile radio device receives the polygon operating area information, and determines the device location. Based on the polygon operating area information, the mobile radio device selects a first channel of operation corresponding to a channel that is available for use within a first polygon operating area. The travel of the mobile radio device is tracked to determine when the mobile radio device has exited the first polygon operating area and entered a second polygon operating area. When this occurs, the device selects a second channel of operation corresponding to a channel that is available for use within the second polygon operating area. Alternatively, the channel selection may be determined by the server and transmitted to the mobile radio device.

8 Claims, 8 Drawing Sheets

SYSTEM AND METHOD FOR USING GEO-LOCATION AND A CENTRALIZED SPECTRUM MANAGEMENT DATABASE TO ENABLE SEAMLESS HANDOVER AND GEO-FENCING OF CHANNEL USAGE IN WIRELESS SYSTEMS

TECHNICAL FIELD OF THE INVENTION

The technology of the present disclosure relates generally to spectrum management, and more particularly, to systems and methods for using geo-location in combination with a spectrum management database to enhance seamless handover and geo-fencing of wireless channel usage.

BACKGROUND

Spectrum management often relies on wireless operations in certain areas (authorized areas) to be on specific channels, to avoid interference with other networks. In addition, the spectrum available in a specific area can often change, and/or devices may move while enduring intermittent wireless connectivity. These considerations make spectrum management and radio operation a challenge in a number of operational situations.

The restriction of channel usage to defined geographic boundaries is sometimes referred to in the art as "geo-fencing". For example, in a typical geo-fencing system wireless communication in a first geographic area may be restricted to a first channel "A", and wireless communication in a second geographic area may be restricted to a second channel "B". The geographic areas may be defined by any conventional means, such as, for example, by geographic unit (e.g., county, zip code, etc), geographic coordinates, FCC defined usage areas, and others.

Often, wireless communication is performed by a mobile radio device, which can move in and out of various geo-fencing areas. Thus, considering the above example, when the mobile radio device is in the first geographic area the mobile radio device communicates via channel A, and when the mobile radio device is in the second geographic area the mobile radio device communicates via channel B. As the mobile device moves between the different geographic areas, there must be a seamless handover of channel usage (for example from channel A to channel B and vices versa) as the mobile radio device moves between the geographic areas. Furthermore, the travel range of the mobile radio device may encompass numerous geographic channel areas (more than two as in the above example), and there may be more than one available channel for use within each channel operating area, which further complicates the need for a seamless handover of channel usage.

Channel operating areas also may overlap, which means, referring to the above example, there may be overlapping areas in which both channels A and B are available. Without a seamless mechanism for channel handover, the result can be "thrashing" in these overlapping areas, by which the mobile radio device is constantly switching between the two available channels.

Current systems for spectrum management, however, have proven deficient with regard to seamless channel handover within a geo-fencing system as a mobile radio device moves among geographic areas associated with different channel usage.

SUMMARY

There is a need in the art for an improved system and methods for seamless channel handover within a geo-fencing system. To facilitate the wireless communications of mobile radio devices, systems and methods are disclosed that accomplish such seamless channel handover within a geo-fencing system.

The systems and methods operate to efficiently determine when a mobile radio device has crossed a geographic boundary defining a boundary for wireless channel usage. The determination of crossing such a boundary permits the mobile radio device to perform spectrum-related management tasks, such as ceasing wireless communications on a channel that is authorized for use up to the boundary, and commencing wireless communications on a channel available after crossing the boundary. The disclosed systems and methods seamlessly transition from a first channel to a different second channel when crossing a geographic channel boundary by using a hysteresis approach to avoid thrashing. Mobile radio devices can utilize a combination of shared data, which may be accessed via a database-driven central server, inherent geo-location capability of the device, and local processing to accomplish these tasks.

The geo-fencing operating areas may be defined in terms of vector based polygons that are provided to a mobile radio device from a server. The server may be part of a cloud hosted spectrum management database. Each operating area has an associated channel list. In exemplary embodiments, the channel list may be a list of available channels that the device may use when inside the polygon operating area. For example, the channel list may be a list of available television (TV) white space channels. In another embodiment, the channel list may be the operating channel and/or identification data for an access point (or base station) that provides wireless services within the polygon operating area.

The server may provide the mobile radio device with the polygon data and channel list data for the operating area in which the device is present, and for adjacent operating areas each respectively defined by an associated polygon. Providing the mobile device with adjacent polygon information increases efficiency and mitigates the effects of intermittent connectivity between the mobile radio device and the server (or the inability to access the server at certain times and places).

As the mobile radio device moves among various polygon operating areas, the mobile radio device leaves given operational areas and enters other operational areas. During the course of this movement, the mobile radio device makes determinations as to which channel to employ based on the channel list information for a current operational area within which the mobile radio device is located. When a geo-fencing boundary is crossed, the mobile radio device makes changes with regard to its wireless communications in accordance with the movement and channel use determinations for a new operating area into which the mobile radio device has entered.

In exemplary embodiments, the mobile radio device changes channel usage when the mobile radio device leaves an operational area where the corresponding currently used channel is no longer available. These determinations may be separate for various operational contexts. For example, when communicating with fixed base stations, movement with respect to the polygon operating areas associated with the base stations may be made as one logical process. If the same mobile radio device also communicates with other devices using other channels (e.g., the mobile radio device communicating directly with other mobile radio devices), the mobile radio device may track its location with respect to polygon operating areas established for these communications and make such channel use decisions as a separate logical process.

An aspect of the invention, therefore, is a mobile radio device. In exemplary embodiments, the mobile radio device includes a network interface that receives polygon operating area information for a plurality of polygon operating areas in which the mobile radio device may engage in wireless communication, wherein each of the polygon operating areas overlaps with at least one other of the polygon operating areas. The mobile radio device further includes a device locator for determining a location of the mobile radio device, and a controller that executes a channel selection application that is stored in a memory. By execution of the channel selection application, the controller is configured to process the polygon operating area information to: determine a first polygon operating area in which the mobile radio device is located; select a first channel of operation corresponding to a channel that is available for use within the first polygon operating area; determine whether the mobile radio device has crossed a boundary of the first polygon operating area and entered a second polygon operating area; and when it is determined that the mobile radio device has crossed the boundary of the first polygon operating area and entered the second polygon operating area, select a second channel of operation corresponding to a channel that is available for use within the second polygon operating area.

Another aspect of the invention is a wireless communications server. In exemplary embodiments, the server includes a memory that stores a database of polygon operating area information for a plurality of polygon operating areas in which a mobile radio device may engage in wireless communication, wherein each of the polygon operating areas overlaps with at least one other of the polygon operating areas. The server further includes a communications interface that transmits the polygon operating area information to the mobile radio device, which then may perform the channel selection operations. Alternatively, the server may determine device location and perform the channel selection operations, and the transmit the channel selections to the mobile radio device over the communications interface.

Another aspect of the invention is a method of performing a channel handover in a mobile radio device. In exemplary embodiments, the method includes the steps of: receiving polygon operating area information for a plurality of polygon operating areas in which the mobile radio device may engage in wireless communication, wherein each of the polygon operating areas overlaps with at least one other of the polygon operating areas; determining a location of the mobile radio device; determining a first polygon operating area in which the mobile radio device is located; selecting a first channel of operation corresponding to a channel that is available for use within the first polygon operating area; determining whether the mobile radio device has crossed a boundary of the first polygon operating area and entered a second polygon operating area; and when it is determined that the mobile radio device has crossed a boundary of the first polygon operating area and entered a second polygon operating area, selecting a second channel of operation corresponding to a channel that is available for use within the second polygon operating area.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

DETAILED DESCRIPTION OF EMBODIMENTS

Figure 1:
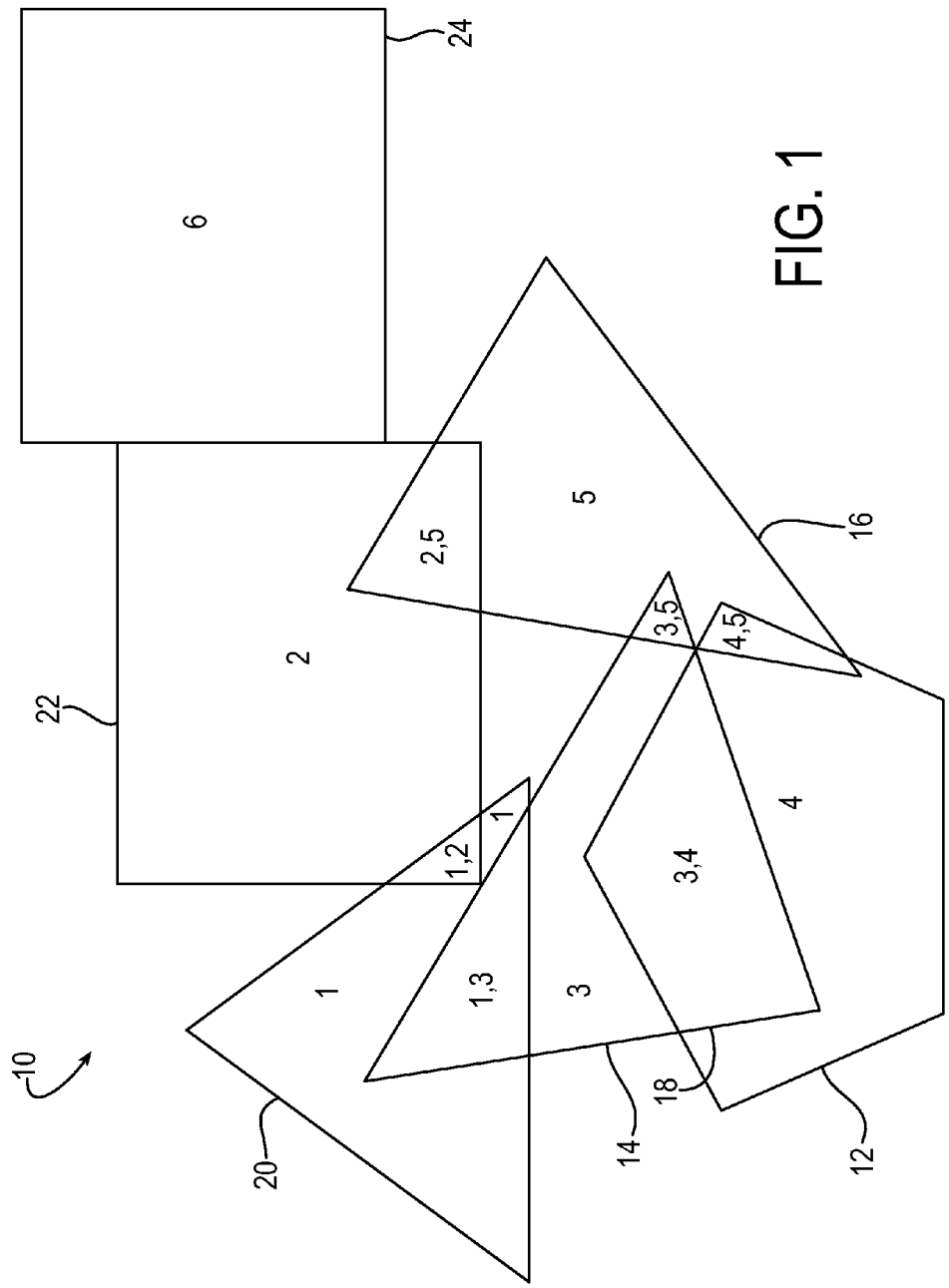
FIG. 1 is a schematic diagram depicting operating areas and associated channel availability in an exemplary geo-fencing system.

Embodiments will now be described with reference to the drawings, wherein like reference numerals are used to refer to like elements throughout. It will be understood that the figures are not necessarily to scale.

It will be appreciated that aspects of the disclosed systems and methods are independent of the type or types of radio devices that may use spectrum. As such, the systems and methods may be applied in any operational context for wireless communications, and wireless communications are expressly intended to encompass unidirectional signal transmissions (e.g., broadcasting of a signal for receipt by a device without response), and to encompass bidirectional communications where devices engage in the exchange of signals. The methods and systems may be applied to licensed or unlicensed spectrum. Furthermore, the methods and systems are generic to modulation schemes, harmonic considerations, frequency bands or channels used by the radio devices, the type of data or information that is transmitted, how the radio devices use received information, and other similar communications considerations. Thus, the systems and methods have application in any suitable communications environment.

FIG. 1 is a schematic diagram depicting operating areas and associated channel availability in an exemplary geo-fencing system 10. In the example of FIG. 1, channel availability is defined as a function of location using polygons. In each polygon in the illustrated example, the channels that are available for use by a mobile radio device are indicated by the numbers 1 through 6. These channels may be, for example, unlicensed channels, licensed channels, or TV white space channels for which registration is typically required. The polygons may be of any number, shape, and orientation. In the example of FIG. 1, a polygon operating area 12 is shaped as a pentagon. Within this polygon, channel 4 is available for use by the mobile radio device. The pentagon operating area 12 overlaps with two triangular operating areas 14 and 16. In triangular operating area 14, channel 3 is available and in triangular operating area 16, channel 5 is available. The area of overlap between the pentagon operating area 12 associated with channel 4 and the triangular operating area 14 associated with channel 3 defines another polygon operating area 18, which is shaped as an irregular quadrilateral and in which both channels 3 and 4 are available.

FIG. 1 depicts additional polygon operating areas 20 (triangular), 22 (rectangular), and 24 (also rectangular) associated respectively with channels 1, 2, and 6. Similarly to the above, where operating areas overlap, multiple channels are available. For example, in the area overlapped by operating area 22 and 16, both channels 2 and 5 are available, and so on as depicted in FIG. 1. As referenced above, it will be appreciated that the configuration of the geo-fencing system 10 in FIG. 1 is an example, and the polygon operating areas may be of any suitable number, shape, and orientation.

The operating areas, and their associated polygons, may be established based on any appropriate policies, rules, geography, coverage of fixed radio devices, or the like. For example, in an exemplary embodiment in which each polygon identifies an area in which one or more TV white spaces are available for use, the rules that are applied to identify the available channels are regulatory agency regulations (e.g., the Federal Communications Commission or FCC in the U.S.) governing the use of TV white space channels so as not to interfere with incumbent broadcasters and other priority users of traditional TV channels.

One or more operating areas may be considered a logical map for the mobile radio device. Each polygon in the logical map is tied to actual geography and may be defined by an array of connected line segments. Mapping standards may be used to identify the polygons. One exemplary standard is GIS (or geographic information system). In some cases, the polygons in the logical map may be defined by a user. In other embodiments, the polygons are defined based on coverage area of relevant radio devices. Coverage areas may be determined using known information, such as sensed signal strengths, and/or using calculated information such as predicted coverage using one or more radio frequency (RF) propagation models.

Figure 2:
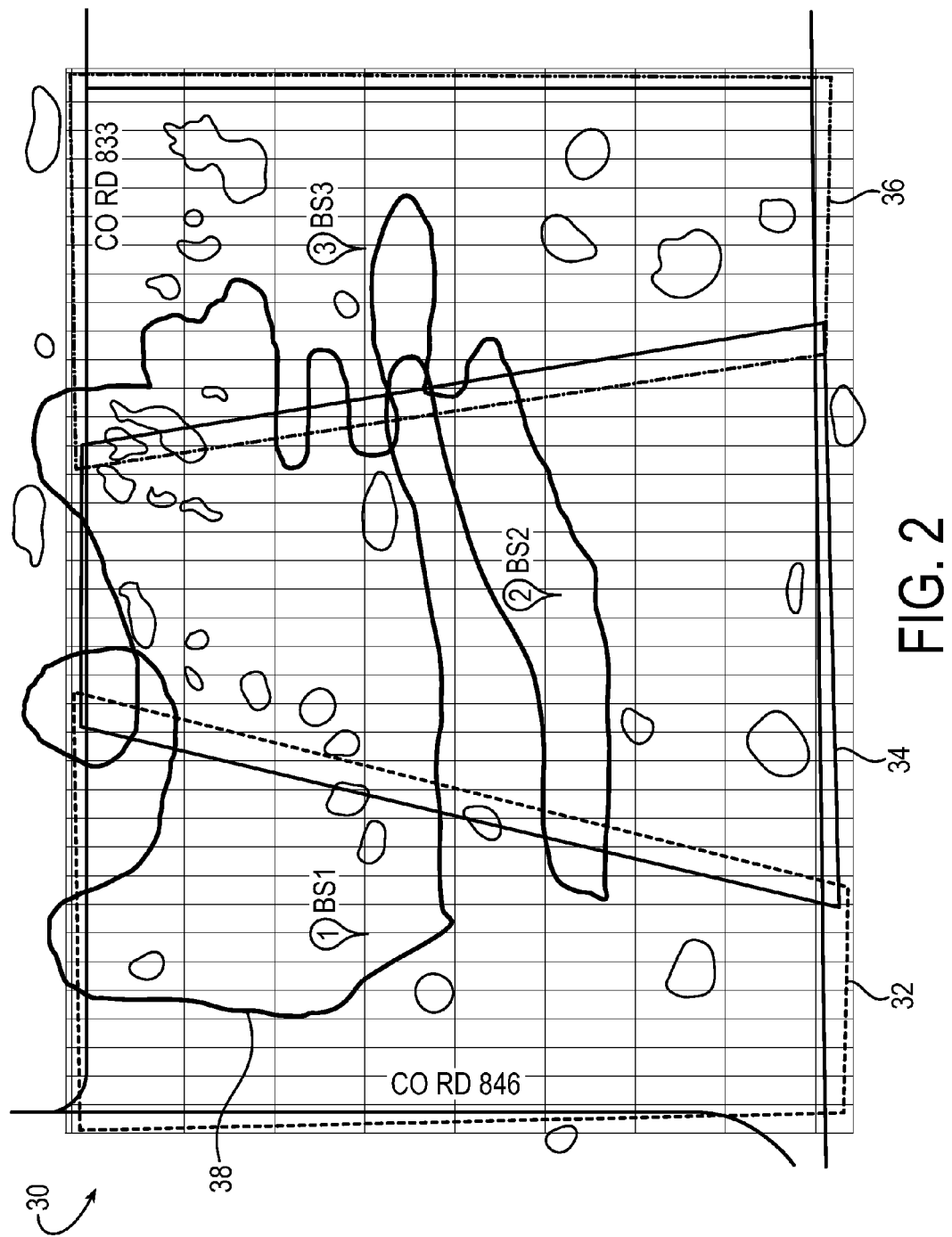
FIG. 2 is a schematic diagram depicting an exemplary logical map of polygon operating areas for a mobile radio device.

FIG. 2 is a schematic diagram depicting an exemplary logical map 30 of operating areas for a mobile radio device. In the example of FIG. 2, the operating areas are defined by coverage areas for base stations that offer wireless communication to a corresponding operating area. FIG. 2 depicts three operating areas 32, 34, and 36, respectively corresponding to wireless communication coverage areas of base stations BS1, BS2, and BS3.

It will be appreciated, that the logical map of FIG. 2 may be applicable to any suitable application of wireless communication by a mobile radio device. For purposes of illustration, an example is described with respect to FIG. 2 in which the logical map 30 is associated with wireless communication on a relatively large farm generally shaped as a rectangle. Within the farm, the three base stations BS1, BS2 and BS3 have been deployed to permit wireless communication with a mobile radio device that moves around the farm. Each base station has a fixed location and provides a corresponding coverage area that defines an operating area for the mobile radio device. Particularly, for each base station, an operating area is defined using a corresponding polygon represented by the quadrilaterals surrounding each base station depicted in FIG. 2. As referenced above, base station BS1 is associated with the polygon operating area 32 shown by a dashed line; base station BS2 is associated with the polygon operating area 34 shown by a solid line; and base station BS3 is associated with the polygon operating area 36 shown by a dashed-dotted line. In the example of FIG. 2, each base station provides access for a corporate network (not shown) to communicate with a mobile electronic radio device on board a moving vehicle. In the context of this farm example, the moving vehicle may be a tractor, a combine harvester, or like device configured to move around the farm based on wireless communication. The mobile electronic radio device also may communicate with other systems (e.g., the Internet) via the base stations. A representative path 38 of the moving vehicle is shown with the thickened solid line. Following the vehicle path, it is seen that the vehicle enters and exits the various polygon operating areas. The channel list associated with each polygon operating area contains the operational channel and/or the base station identification information for the respective base station.

In exemplary embodiments, each apex of each polygon operating area is defined by a geographic coordinate value. For example, using hypothetical representative coordinates the three polygon operating areas 32, 34, and 36, corresponding to the base stations BS1, BS2, and BS3 in FIG. 2, may be expressed in the following format:

Polygon for BS1
{{−81.123968,26.427900},
{−81.113632,26.427902},
{−81.105311,26.459926},
{−81.125438,26.459269}};
Polygon for BS2
{{−81.114547,26.42823},
{−81.087658,26.429295},
{−81.093876,26.45968},
{−81.106866,26.459516}};
Polygon for BS3
{{−81.089121,26.429213},
{−81.076316,26.429211},
{−81.07686,26.460498},
{−81.094973,26.459926}}.

As the mobile radio device moves, for example as moved by the moving vehicle in this example moving around the path 38, at times the mobile radio device leaves a current given polygon operating area and enters another polygon operating area. During such movement, the moving vehicle, and therefore the mobile radio device, crosses boundaries between polygon operating areas numerous times, as seen for example by following the path 38 in FIG. 2. As described in more detail below, during the course of this movement, the mobile radio device makes determinations as to which channel to employ based on the channel list information for the appropriate operating area in which the mobile radio device is present. If appropriate, the mobile radio device makes corresponding changes with regard to its wireless communications in accordance with the movement and channel use determinations for a new operating area into which the mobile radio device has entered.

In exemplary embodiments, the mobile radio device makes a change in channel use when the mobile radio device leaves a current operating area where the associated currently used channel is no longer available. These determinations may be separate for various operational contexts. For example, when communicating with base stations as depicted in FIG. 2, movement with respect to the polygon operating areas associated with the base stations may be made as one logical process. If the same mobile radio device also communicates with other devices using other channels (e.g., the mobile radio device communicates directly with other mobile radio devices, such as a tractor communicating with a loader, truck, harvester, combine, etc. using TV white spaces), the mobile radio device may track its location with respect to polygon operating areas established for these communications (e.g., polygons established for white space channel availability, which are likely different from the polygons established for fixed location access points or base stations) and make such channel use decisions as a separate logical process.

As seen in both the representative examples of FIGS. 1 and 2, adjacent polygon operating areas typically have some overlap in which channels for both of the adjacent operating areas are available. Considering the presence of an overlapping configuration of operating areas, FIG. 3 is a schematic diagram depicting exemplary channel usage determinations for two overlapping operating areas 40 and 42.

Figure 3:
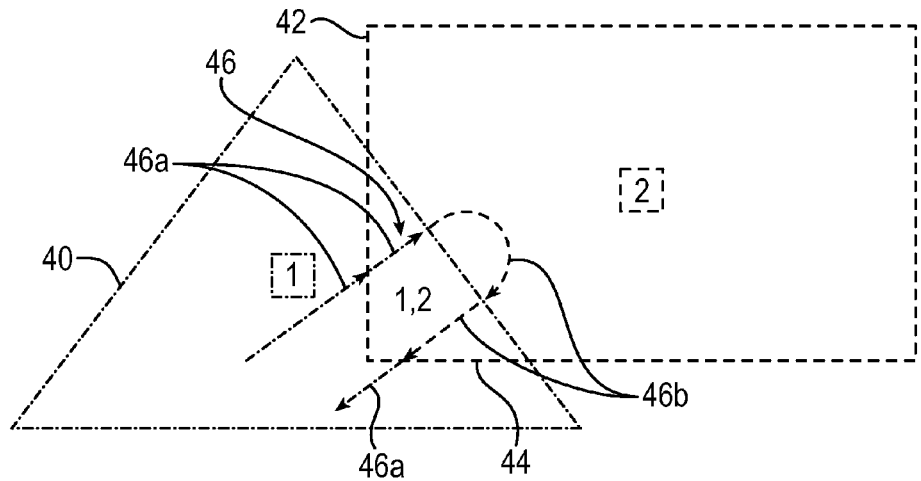
FIG. 3 is a schematic diagram depicting exemplary channel usage determinations for overlapping operating areas.

For example, as depicted in FIG. 3, channel 1 is available for use in a triangular polygon operating area 40, and channel 2 is available for use in an adjacent and overlapping rectangular polygon operating area 42. A third polygon operating area 44 (in this case another triangular operating area) is defined by the overlap of the polygon operating area 40 for channel 1 and the polygon operating area 42 for channel 2. In this third polygon operating area 44 defined by such overlap, both channels 1 and 2 are available.

A hysteresis algorithm may be employed to control the precise transitioning of channels when the mobile radio device crosses the polygon operating area boundaries. This prevents the mobile radio device from thrashing between channels (i.e., constantly switching between available channels) in the area of overlap. In exemplary embodiments, the selected channel changes only when leaving the polygon operating area associated with the channel that is currently in use. This applies for the operational scenario in selecting a channel from plural potential available channels (e.g., selecting from available white space channels), or for the operational scenario in determining which of plural base stations or access points with which to communicate.

Such a hysteresis algorithm for channel section may be illustrated with reference to the example depicted in FIG. 3. In the example of FIG. 3, reference numeral 46 represents an exemplary travel path of a mobile radio device. As explained in detail as follows, path portions 46a, as represented by the dashed-dotted lines, denote the portions of the path in which the mobile radio device uses channel 1, and path portions 46b, as represented by the simple dashed line, denote the portions of the path in which the mobile radio device uses channel 2. The mobile radio device starts in the triangular operating area 40 for channel 1 and communicates using channel 1. Then, the mobile radio device moves into the overlapping polygon operating area 44 in which both channels 1 and 2 are available. Because channel 1 is in use and the mobile radio device is still in the original polygon operating area 40, the mobile radio device does not make a change in channel use (the path line remains dash-dotted). Next, the mobile radio device departs both the original polygon operating area 40 associated with channel 1, and the overlapping polygon operating area 44 associated with both channels 1 and 2. The mobile radio device now enters the polygon operating area 42 associated with only channel 2. At this point, the mobile radio device changes from using channel 1 to using channel 2 (the path line is now the simple dashed line).

Next, the mobile radio device moves back into the overlapping polygon operating area 44 in which both channels 1 and 2 are available. Because channel 2 is in use and the mobile radio device is still in the polygon operating area 42 for channel 2, the mobile radio device does not make a change in channel use (the path line remains dashed). Next, the mobile radio device departs both the polygon operating area 42 associated with channel 2, and the overlapping polygon operating area 44 associated with both channels 1 and 2. The mobile radio device now re-enters the polygon operating area 40 associated with only channel 1. At this point, the mobile radio device changes from using channel 2 to using channel 1 (the path line becomes dash-dotted again).

The described algorithm constitutes a hysteresis algorithm in that the channel selection is determined via a "make before break" handover. The channel selection depends on the previous path of the mobile radio device. On such basis, as described above for example in FIG. 3, whether or not the mobile radio device uses channel 1 or 2 in the overlapping polygon operating area 44 depends upon the travel history of the mobile radio device.

In exemplary embodiments, the mobile radio device may use its location (e.g., as determined using GPS) to assess its location relative to the various polygon operating areas. In one exemplary approach, a sign change in the dot product of a location vector and a boundary vector indicates that the boundary line has been crossed. Generally, a location vector for a mobile radio device is defined by a vector from the device location to any point on a polygon operating area's boundary line segment. A boundary vector is a vector normal to the line segment defining the boundary of the polygon operating area.

Figure 4:
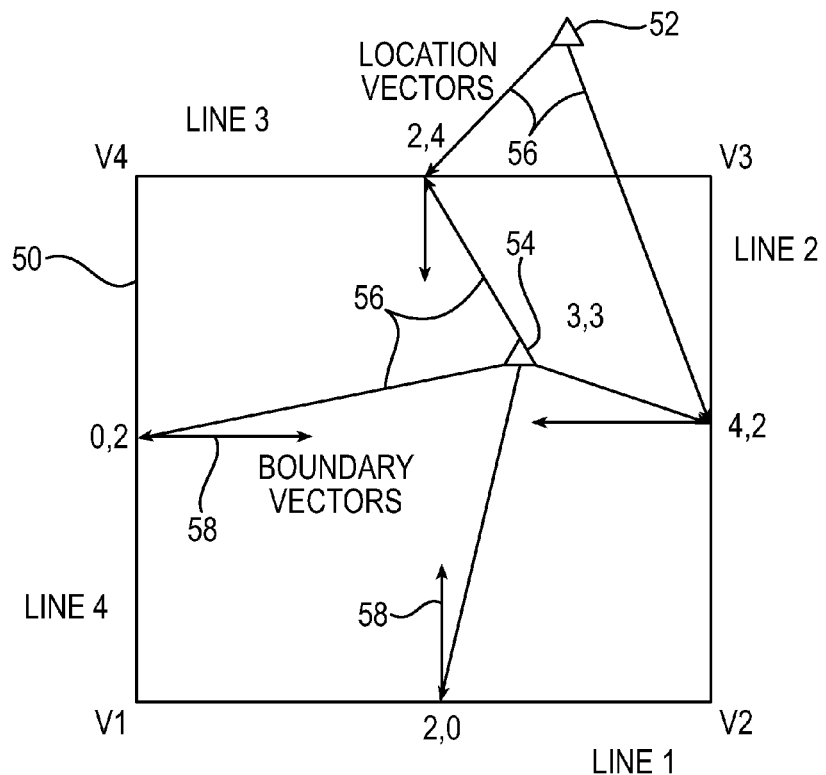
FIG. 4 is a schematic diagram depicting an exemplary polygon operating area and graphically showing an example of location vectors relative to boundary vectors for determining that a boundary line has been crossed.

In accordance with such mathematical approach, FIG. 4 is a schematic diagram depicting an exemplary polygon operating area 50, and showing graphically an example of location vectors relative to boundary vectors for determining that a boundary line has been crossed. The polygon operating area 50 of this example is generally square shaped and defined by boundary lines 1-4 that meet at vertices v1-v4. Two example device locations 52 and 54 are depicted. Location vectors 56 are defined as vectors from each device location to a boundary of the polygon operating area. As seen in FIG. 4, location vectors may be defined with respect to any of the boundary lines of the polygon operating area relative to the device locations. In addition, boundary vectors 58 are defined as a vector normal to the line segment defining the boundary of the of the polygon operating area. A sign change in the dot product of a location vector and a boundary vector indicates that the boundary line has been crossed. For a given mobile radio device, if a location vector is designated "v" and a boundary vector is designated "ω", the dot product of the two vectors may be expressed mathematically as follows:

$$\vec{v} \cdot \vec{w} = (v_x \hat{i} + v_y \hat{j}) \cdot (w_x \hat{i} + w_y \hat{j}) \quad \text{EQ (1)}$$
$$= v_x w_x \hat{i} \cdot \hat{i} + v_y w_y \hat{j} \cdot \hat{j} + v_x w_y \hat{i} \cdot \hat{j} + v_y w_x \hat{j} \cdot \hat{i}$$
$$= v_x w_x + v_y w_y$$

A change in the sign of the result of this dot product indicates that a boundary line has been crossed. Such a calculation may be implemented using computer code stored on a computer readable medium as part of a channel selection computer program application. Referring back to FIG. 2, for example, Java code may be written for determining boundary crossings relative to the depicted polygon operating areas. Exemplary handover code is attached hereto as an appendix, which includes code for determining boundary crossings and resultant channel selection with respect to the example polygon operating areas depicted in FIG. 2.

Figure 5:
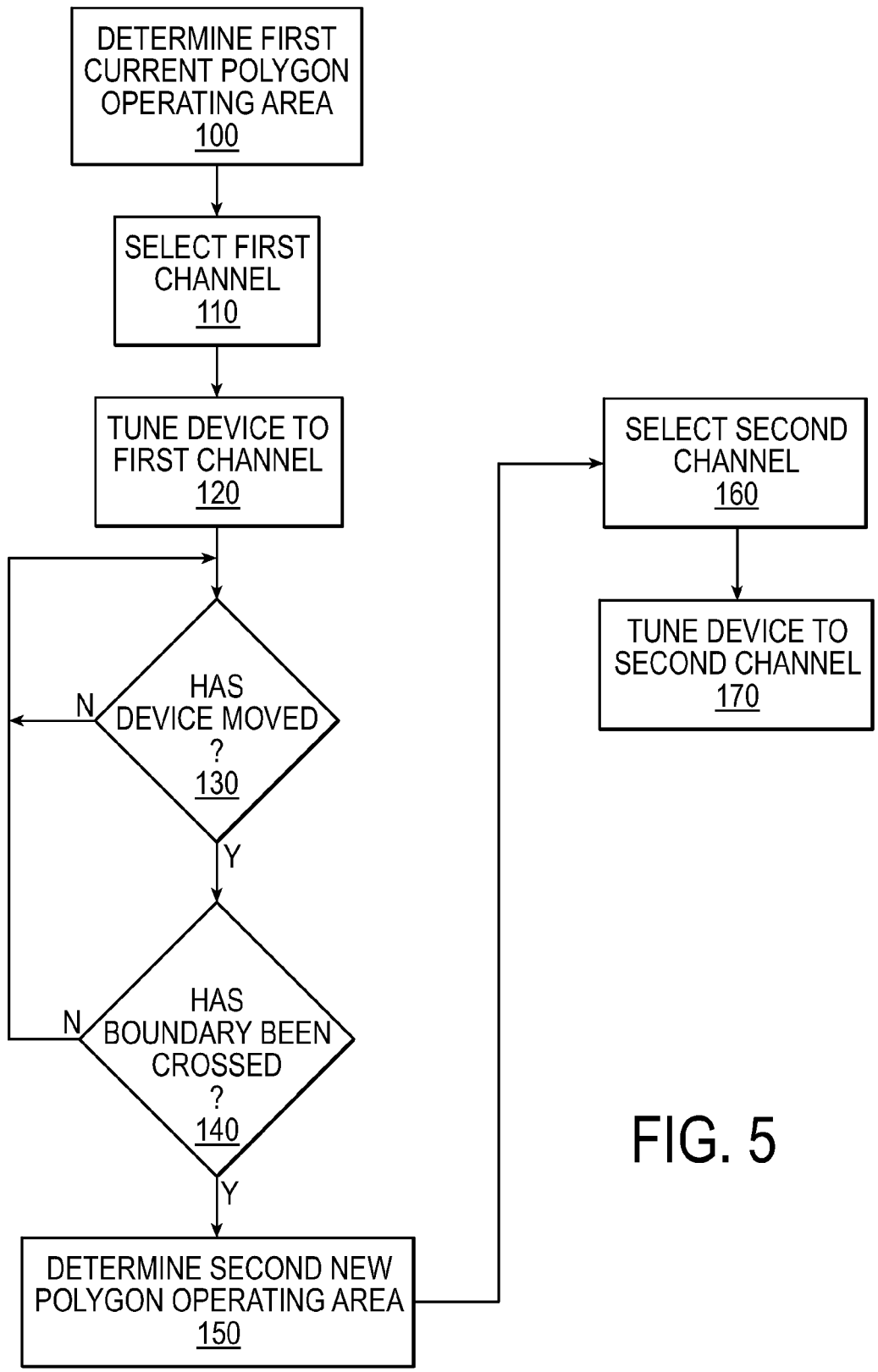
FIG. 5 is a flow chart diagram depicting an overview of an exemplary method of channel section for a mobile radio device.

In accordance with the above description, FIG. 5 is a flow chart diagram depicting an overview of an exemplary method of channel handover selection for a mobile radio device. Although the exemplary method is described as a specific order of executing functional logic steps, the order of executing the steps may be changed relative to the order described. Also, two or more steps described in succession may be executed concurrently or with partial concurrence. It is understood that all such variations are within the scope of the present invention.

The method may begin at step 100 at which a determination is made as to a first polygon operating area in which the mobile radio device is currently located. The location of the mobile radio device may be determined, for example, by a "point in polygon" or "PIP" method. In such a method, each polygon is defined by line segments and is associated with a channel list, as described above. The polygon location of the mobile radio device is determined by projecting a ray from a location to the mid-point of a line segment of the polygon. The number of times the ray punctures a polygon line segment is used to determine if the current location is within the polygon, or outside of the polygon. It will be appreciated, however, that methods other than PIP may be used to determine in which first polygon operating area a device is located.

Once the polygon location of the mobile radio device is determined, at step 110 a channel selection is made as to a first channel that is associated with the first polygon operating area in which the mobile radio device is located. At step 120, the mobile radio device is tuned to the first selected channel. In exemplary embodiments, the first polygon operating area may be associated with only one channel, which would become the first selected channel. Alternatively, the first polygon operating area may be associated with a channel list, and the first channel may be selected from among the multiple channels in the list by one of a variety of selection methods as are known in the art. For example, a channel may be selected from an available channel list based on signal strength, current usage and capacity, usage restrictions, and various other bases. The channel selection further may include causing the mobile radio device to enter an idle state. This may be appropriate, for example, if the mobile radio device is located outside of a designated coverage area for mobile communications.

Referring again to FIG. 5, at step 130 the location of the mobile radio device is monitored to detect whether a change in location occurs. As seen by the loop of step 130, the monitoring may occur continuously (a "No" determination in step 130) until a change in location has occurred (a "Yes" determination in step 130). Once a change in location is detected, at step 140 a determination is made as to whether a boundary of the first polygon operating area has been crossed. If a "No" determination is made in step 140, the location of the mobile radio device will continue to be monitored pursuant to step 130.

If, however, a "Yes" determination is made at step 140, indicating a boundary of the first polygon operating area has been crossed, the method proceeds to step 150. At step 150 (similarly as to step 100), a determination is made as to a second new polygon operating area in which the mobile radio device is now located after crossing the boundary. At step 160 (similarly as to step 110), a second channel selection is made as to a second channel that is associated with the second polygon operating area in which the mobile radio device is now located after crossing the boundary. At step 170 (similarly to step 120), the mobile radio device is tuned to the second selected channel. The second channel again may be a designated channel or otherwise selected from an available channel list, or be selected as idling the mobile radio device if the mobile radio device has moved outside of a designated coverage area for mobile communications.

The method of FIG. 5 may be performed continuously as a mobile radio device moves among various polygon operating areas for wireless communication. Channels are therefore selected via a hysteresis algorithm in which a new channel selection is made each time it is detected that the mobile radio device has crossed a boundary leaving a first polygon operating area in which the mobile radio device currently is operating, and commensurately entering a second polygon operating area that is associated with the new channel selection to be made. The boundary crossing are determined by the dot product calculations described above, which may be implemented by executing a program including handover code comparable to the code in the attached appendix.

Figure 6:
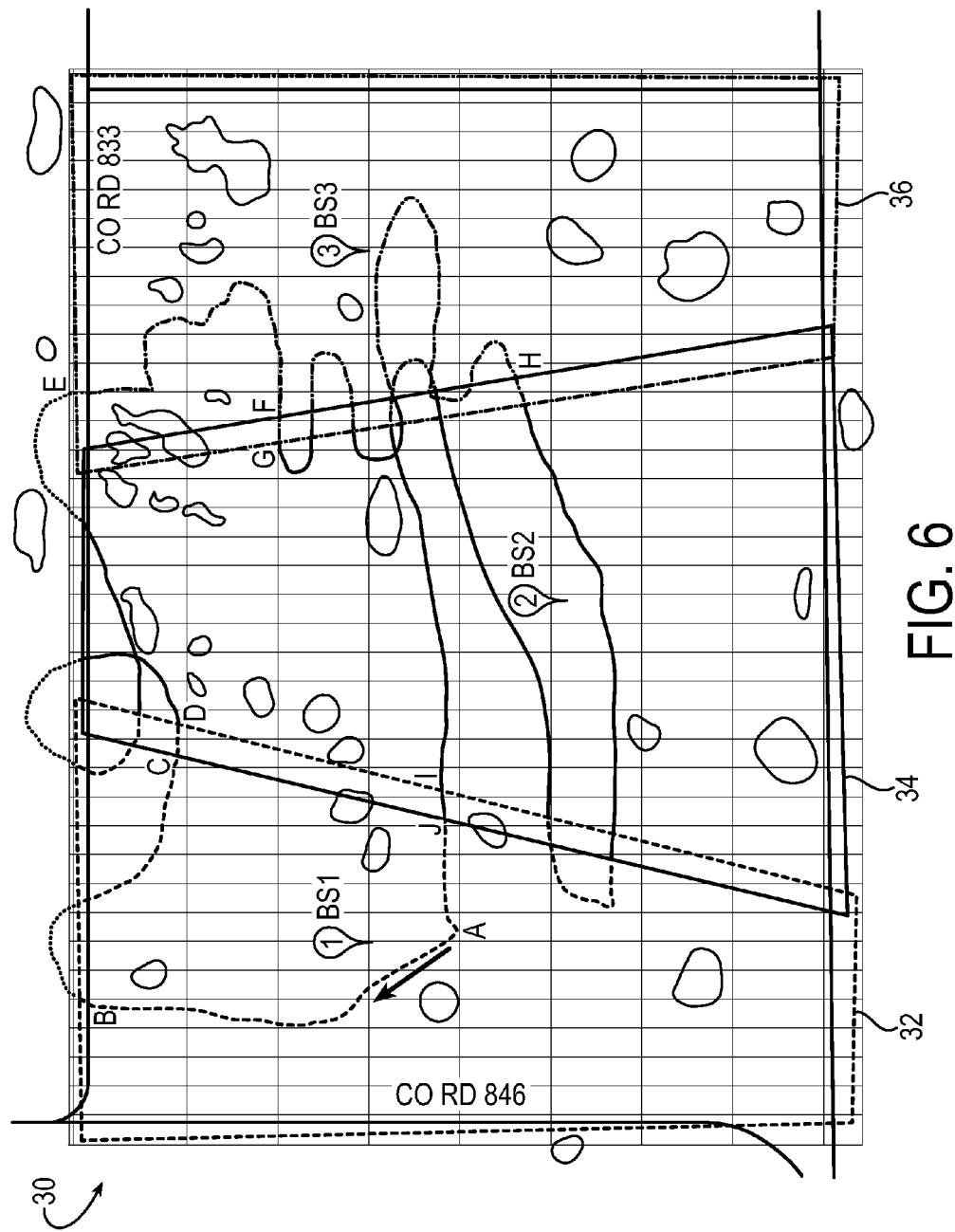
FIG. 6 is a schematic diagram depicting the exemplary logical map of FIG. 2 of polygon operating areas for a mobile radio device, modified to depict channel selection for the mobile radio device.

FIG. 6 is a schematic diagram depicting the exemplary logical map of FIG. 2 of polygon operating areas for a mobile radio device, modified to depict channel selection and handover for the mobile radio device in accordance with the hysteresis algorithm described above. Accordingly, like portions of the logical map of FIG. 6 are denoted with reference numerals comparably as in FIG. 2.

FIG. 6 depicts the described hysteresis channel allocation and handover technique in the example from above, where a tractor moves about a farm having three base stations BS1, BS2, and BS3, and three corresponding polygon operating areas 32, 34, and 36. An arbitrary starting point A is indicated on FIG. 6 along with an arrow indicating the initial direction of travel. A resulting channel allocation for the mobile radio device transported by the tractor will be as follows.

The line indication of the path of the mobile radio device changes among the line indications in coordination with the line indications for the polygon operating areas associated with the corresponding base station (i.e., the path portion for a BS1 channel associated with the polygon operating area 32 has a dashed line indication; the path portion for a BS2 channel associated with the polygon operating area 34 has a solid line indication; and a path portion for a BS3 channel associated with the polygon operating area 36 has a dashed-dotted line indication). The path appears as a simple dotted line for portions of the path of travel in which the mobile radio device is outside of all of the polygon operating areas for which coverage wireless communication is provided.

The travel and corresponding channel selection and handover is as follows, with several illustrative points of interest being designated. The mobile radio device starts at point A within the polygon operating area 32, and is tuned to a channel associated with the polygon operating area 32. As illustrative of this channel selection, the line designation of the path from point A now matches the line designation defining polygon operating area 32 (dashed line). At point B, the mobile radio device leaves the coverage area for all three base stations, and thus the device may be idled until reentering the polygon operating area 32 (dotted line).

The mobile device then travels through points C and D. It is noted that between points C and D, the mobile radio device is in an overlapping coverage area of polygon operating areas 32 and 34. At crossing point C, the mobile radio device remains within polygon operating area 32 and enters polygon operating area 34. According to the hysteresis model described above, the channel does not change when the mobile radio device crosses point C because the mobile radio device remains within the polygon operating area 32 of the currently selected channel. Rather, a new channel selection is made when the mobile radio device crosses point D, when the mobile radio device crosses the boundary of and exits polygon operating area 32. Upon crossing point D, a new channel selection is made of a channel that is associated with the polygon operating area 34. As illustrative of this channel handover, the line designation of the path from point D now matches the line designation defining polygon operating area 34 (solid line).

The travel path continues between polygon operating areas 32 and 34 (including travel portions outside all of the defined polygon operating areas) until the mobile radio device reaches point E. At point E, the mobile radio device crosses into polygon operating area 36, and a channel is selected that is associated with polygon operating area 36. As illustrative of this channel handover, the line designation of the path from point E now matches the line designation defining polygon operating area 36 (dashed-dotted line).

The mobile radio device then proceeds to cross points F and G. Similarly to the above, it is noted that between points F and G, the mobile radio device is in an overlapping coverage area of polygon operating areas 36 and 34. At crossing point F, the mobile radio device remains within polygon operating area 36 and enters polygon operating area 34. According to the hysteresis model described above, the channel does not change when the mobile radio device crosses point F because the mobile radio device remains within the polygon operating area 36 of the currently selected channel. Rather, a new channel selection is made when the mobile radio device crosses point G, when the mobile radio device crosses the boundary of and exits polygon operating area 36. Upon crossing point G, a new channel selection is made of a channel that is associated with the polygon operating area 34. As illustrative of this channel handover, the line designation of the path from point G now matches the line designation defining polygon operating area 34 (solid line).

Between travel points G and H, the mobile radio device loops among the various polygon operating areas 32, 34, and 36. Generally, according to the hysteresis algorithm employed to control the transitioning and handover of channels when the mobile radio device crosses the polygon operating area boundaries, the selected channel changes only when leaving the polygon operating area associated with the channel that is currently in use. As referenced above, this prevents the mobile radio device from thrashing between channels in the area of overlap of two polygon operating areas.

As further illustrative of the hysteresis algorithm, travel points I and J essentially represent the opposite of what occurred at travel points C and D. It is noted that between points I and J, the mobile radio device again is in an overlapping coverage area of polygon operating areas 34 and 32. At crossing point I, the mobile radio device remains within polygon operating area 34 and enters polygon operating area 32. According to the hysteresis model described above, the channel does not change when the mobile radio device crosses point I because the mobile radio device remains within the polygon operating area 34 of the currently selected channel. Rather, a new channel selection is made when the mobile radio device crosses point J, when the mobile radio device crosses the boundary of and exits polygon operating area 34. Upon crossing point J, a new channel selection is made of a channel that is associated with the polygon operating area 32. As illustrative of this channel handover, the line designation of the path from point J now matches the line designation defining polygon operating area 32 (dashed line).

A similar hysteresis model or algorithm may be applied to various applications in which a mobile radio device moves in and out of wireless communication coverage areas associated with different available channels. For example, in another exemplary embodiment a train may offer Internet access to passengers using a TV white space radio. The available TV white space channels may change as the train travels, but the path of the train is likely to be known in advance of travel. The train may seek available channel information from a server for the planned path of travel. The server may return information (e.g., polygon operating area information and associated channel lists) for a series of polygon operating areas along the planned route. Using this information, the mobile radio device may make channel handover selections as the train moves among the polygon operating areas. In other situations where the planned path of travel may not be known, a server may supply information (e.g., polygon operating area information and associated channel lists) for a polygon operating area in which the device is located and for adjacent polygon operating areas. If the mobile radio device moves into one of the adjacent areas, the server may update the information for any newly adjacent polygon operating areas.

Figure 7:
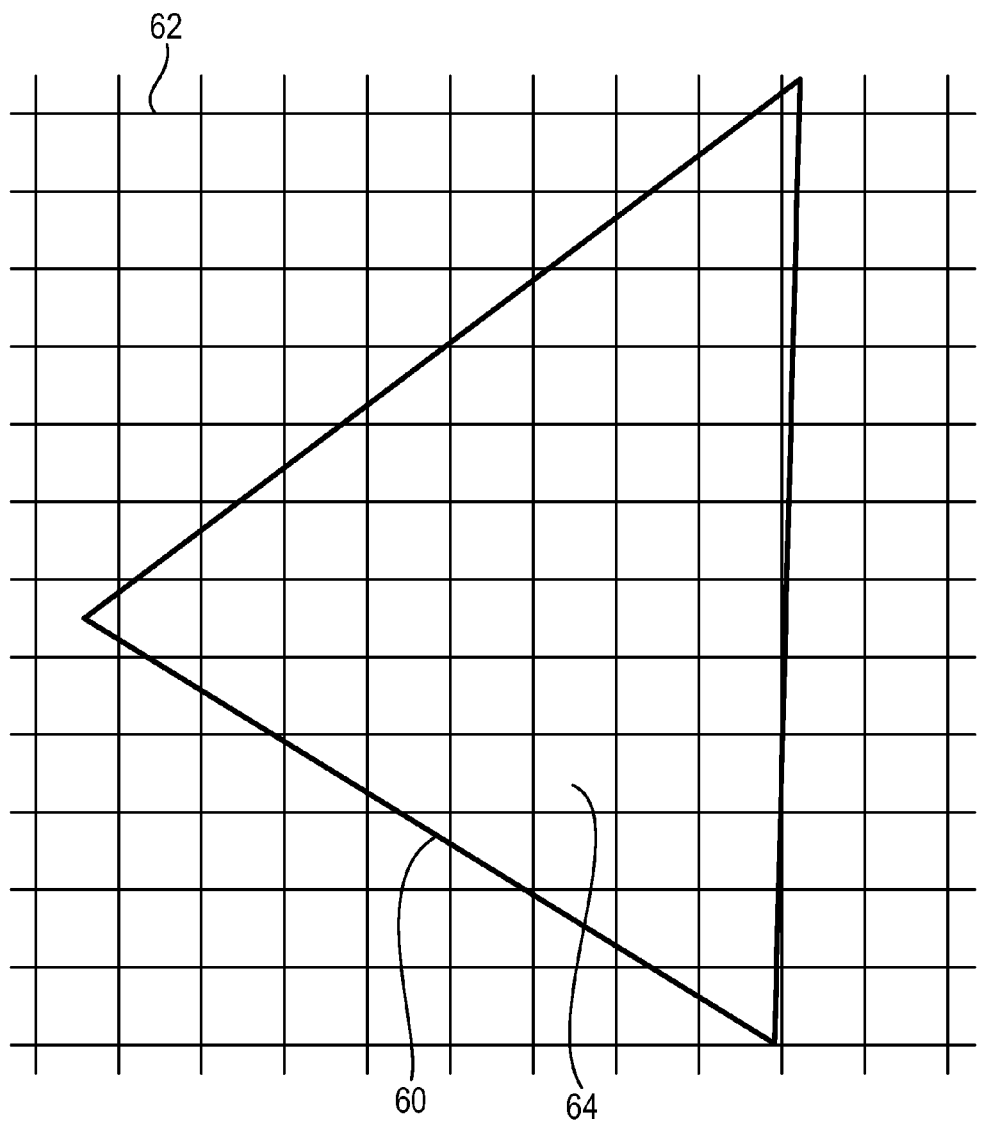
FIG. 7 is a schematic diagram depicting an exemplary polygon operating area defined based on a grid.

In exemplary embodiments, the boundaries of each polygon operating area are determined using a grid of locations, such as points located at the intersection of vertical and horizontal lines spaced apart by a known distance. An exemplary distance may be 50 meters, although any suitable grid distance may be employed. FIG. 7 is a schematic diagram depicting an exemplary polygon operating area 60 defined based on a grid 62. In other exemplary embodiments, offset rows of location may be used, or some other arrangement of locations may be used.

An assessment of channel availability may be made at each location of intersecting lines that denote grid locations. For each available channel within the grid of locations, at least one polygon operating area is drawn. Each polygon operating area subscribes locations in which the channel is available. Multiple locations are in the same polygon if the locations have the same channel available and are adjacent another location having the same available channel. For instance, in FIG. 7, a triangular polygon operating area 60 is shown that subscribes a plurality of locations 64 within the grid 62. Each location 64 within the triangular operating area 60 has the same channel availability and are vertically and/or horizontally adjacent to other locations where the channel is available. Locations immediately outside the triangular operating area 60 have different channel availability. Under the described hysteresis algorithm, channel handover is performed upon crossing a polygon boundary. Accordingly, locations on the polygon line itself are treated for channel availability as being part of the polygon. It is possible that locations not adjacent locations in the triangle will have the same channel available as the location in the triangle, but since those locations do not neighbor the locations within the triangle in a contiguous manner, those locations will be subscribed by one or more different polygon operating areas.

In other exemplary embodiments, a polygon operating area is established specifically for a given mobile radio device. This polygon operating area may be a polygon surrounding the mobile radio device, which moves with the mobile radio device and may have any appropriate shape. For each location in the polygon, a list of available channels is determined for each location on the grid that defines the polygon operating area. Then, the channels that are available at each location in the polygon are identified. The identified channels are used to populate the channel list passed to the mobile radio within the define polygon operating area. Neighboring polygons and available channel lists may be established and also transmitted to the mobile radio device. This approach allows more freedom of travel for the mobile radio device without having to request a new channel map every time the location of the device changes more than a predetermined amount (e.g., 50 meters).

The disclosed embodiments involve geo-fenced channel usage, using polygon-based channel maps. The described techniques allow a mobile radio device to determine when it leaves the defined polygon operating area, which is associated with one or more channels. As a result, the device does not need to continuously query for a channel map as a function of each location. Additionally, the described embodiments allow for seamless channel handover transitions while moving, and reduces or eliminates thrashing in overlapping coverage areas. This is accomplished, in part, by defining overlapping polygon operating areas and using a hysteresis algorithm in which departure from a polygon operating area is used to trigger a change in channel usage. Additionally, a channel map identifying one or more channels may be provided to the device where the channel map is valid for an entire area. A server, other electronic device, or user may specify the area delineation of each polygon operating area. Alternatively, the polygon operating areas may be ascertained based existing channel use.

Considering such advantages, the described invention specifically operates differently as compared to conventional cellular type systems. In conventional cellular systems, channel handoff generally is based on various signal parameters, such as, for example, congestion or signal strength, because conventional cellular systems operate based on interference probability of a given user device relative to other spectrum users. In the described invention, in contrast, the polygon operating area boundaries are precisely defined, and thus the channel handover is not related to parameters employed in conventional systems. The described hysteresis algorithms, therefore, provide a distinctive manner of channel handover as compared to conventional cellular systems.

Figure 8:
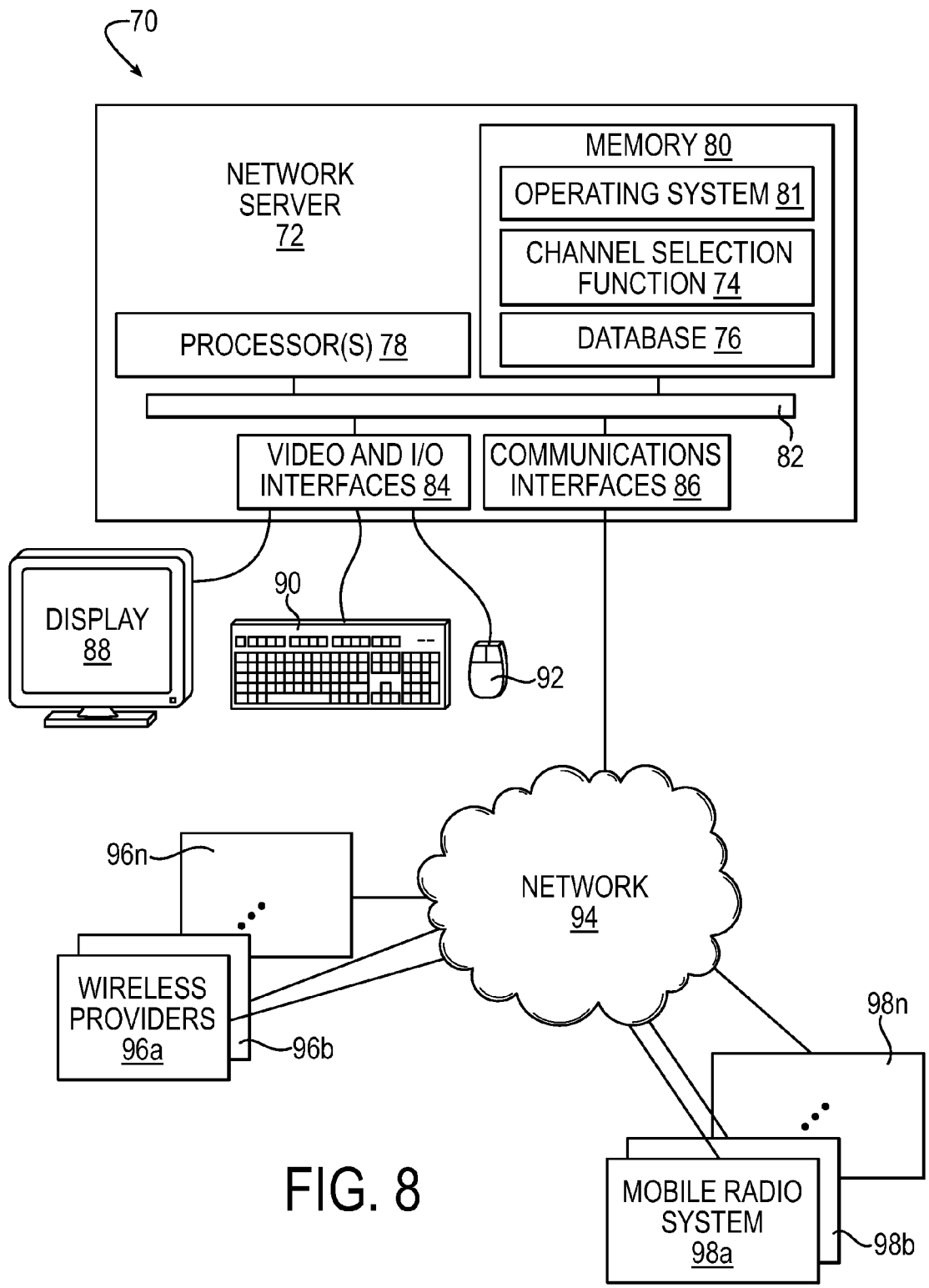
FIG. 8 is a schematic diagram depicting an exemplary system for channel handover selection for a mobile radio device.

FIG. 8 is a schematic view of an exemplary system for channel selection for a mobile radio device. FIG. 8 illustrates a schematic block diagram of a computer-based system 70 capable of executing computer applications (e.g., software programs). The system 70 may include a network server 72 that is implemented using computer technology. The network server 72 may be configured to execute a channel selection function 74 and to store a database 76 that contains data regarding polygon operating area information that may be utilized by the channel selection function 74. The database 76 may store such information as information defining the boundaries of polygon operating areas, and channel lists associated with the various defined polygon operating areas. The channel selection function 74 may be executed to provide polygon operating area information from the database 76 to mobile radio devices.

The network server 72 may be capable of communicating with various video and input/output (I/O) interfaces 84 as well as one or more communications interfaces 86. The interfaces 84 may be used to operatively couple the computer system 70 to various peripherals, such as a display 88, a keyboard 90, a mouse 92, other input devices and peripherals. The interfaces 84 may be employed for entering the polygon operating area information that would be stored within the database 76, and may be devices that communicate remotely over a network. The communications interfaces 86 may include for example, a modem and/or a network interface card. The communications interfaces 26 may enable the system 70 to send and receive data signals and the like to and from other computing devices via an external network 94 (e.g., the Internet, a wide area network (WAN), a local area network (LAN), direct data link, or similar systems). The interface between the network server 72 and any operatively interfaced device or network may be wired or wireless.

A memory 80 may store an operating system 81 that is executed by the processor 78 to control the allocation and usage of resources in the server 72, as well as provide basic user interface features. Specifically, the operating system 81 controls the allocation and usage of the memory 80, the processing time of the processor 78 dedicated to various applications being executed by the processor 78, and the peripheral devices, as well as performing other functionality. In this manner, the operating system 81 serves as the foundation on which applications, such as the channel selection function 74, depend as is generally known by those with ordinary skill in the art.

In one embodiment, the network server 72 may be configured to execute the channel selection function 74 to host the above-described channel selection operations for mobile radio devices. In the illustrated example, the network server 72 may be configured to operate over the network 94 in conjunction with a plurality of wireless communication providers 96a through 96n. The wireless communication providers, for example, may be TV white space stations, or may correspond to the base stations such as those of FIGS. 2 and 6. For each provider or base station, polygon operating area information, including polygon operating area boundaries and associated channel lists, may be acquired via the interface 84 and/or communications interface 86, and stored in the database 76 of the server 72.

The memory 80 may store data, logic routine instructions, computer programs, files, operating system instructions, and the like. The memory 80 may comprise several devices, including volatile and non-volatile memory components. Accordingly, the memory 80 may include, for example, random access memory (RAM) for acting as system memory, read-only memory (ROM), hard disks, floppy disks, optical disks (e.g., CDs and DVDs), tapes, flash devices and/or other memory components, plus associated drives, players and/or readers for the memory devices. The processor 78 and the components of the memory 80 may be coupled using a local interface 82. The local interface 82 may be, for example, a data bus with accompanying control bus, a network, or other subsystem.

In addition, the server 72 may be in communication with a plurality of mobile radio devices 98a-98n. The server 72 may acquire mobile radio device information, including location information in the manner described above (for example by PIP processing). Based on the mobile radio device information and the polygon operating area information stored in the database 76, the server may operate to provide polygon operating area information to a given mobile radio device. For example, the processor 78 may execute the channel selection function 74 to push polygon operating area information and associated channel list information to a mobile radio device, as the mobile radio devices move among the polygon operating area.

Figure 9:
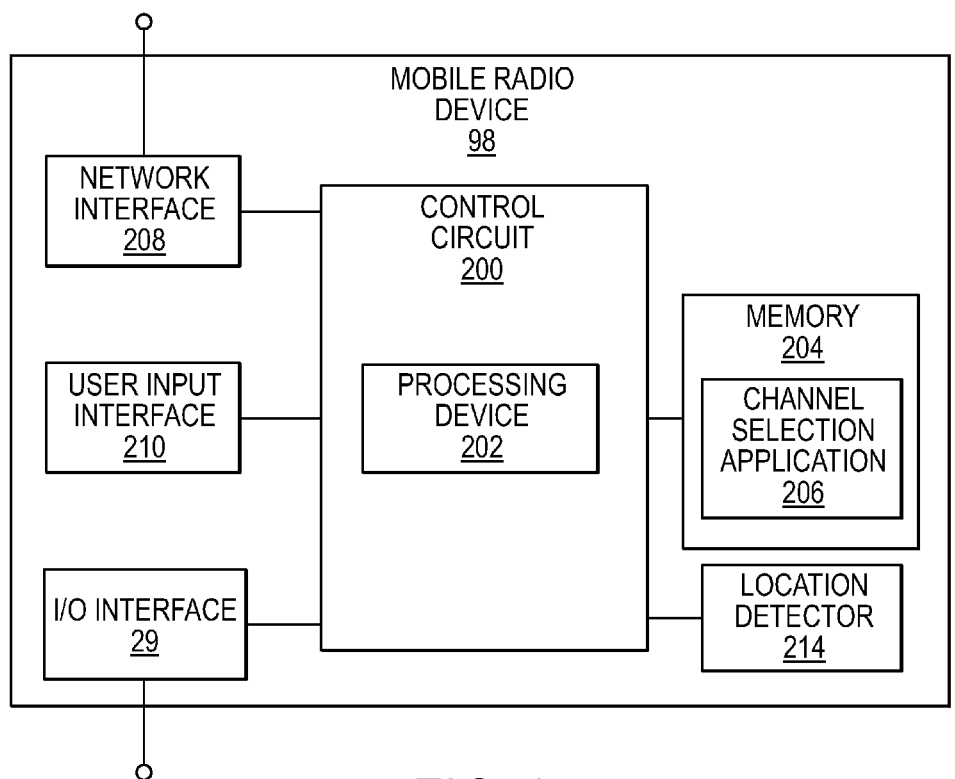
FIG. 9 is a schematic block diagram depicting operation portions of a mobile radio device for use in the system of FIG. 8.

FIG. 9 is a schematic block diagram depicting operational portions of a mobile radio device for use in the system of FIG. 8. The mobile radio device 98 also has a computer based architecture. The mobile radio device 98 that may include a controller 200 with one or more processing devices 202 that executes a channel selection application 206 stored on a non-transitory computer readable medium, such as a memory 204. In exemplary embodiments, the channel selection application 206 is embodied as one or more computer programs (e.g., one or more software applications including compilations of executable code). The computer program(s) may be stored on the memory 204, which may be any type of computer readable medium, such as a magnetic, optical or electronic storage device (e.g., hard disk, optical disk, flash memory, etc.).

The mobile radio device 98 may include a network interface for establishing a communication with the server 72 via the network 94. The mobile radio device 98 may include a user input interface 210 that permits a user to enter a variety of text, data, control, and other inputs. The user input interface may include one or more input devices, examples of which may include a keyboard, keypad, soft keys, mouse, pointer, stylus, and similar input instruments, and combinations thereof. The mobile radio device may include an I/O interface 212 that permits connection to a variety of conventional I/O devices. The mobile radio device also may have a location detector 214 for determining the location of the mobile radio device. The location detector 214 may be a GPS device or other location detection device as are known in the art.

Referring to FIGS. 8 and 9, the controller 200 with processing device 202 is used to execute instructions that carry out a specified logic routine(s) that constitute the channel selection application 206. For example, the mobile radio device 98 may be in communication with the server 72. The mobile radio device may transmit location information to the server, and/or the server may detect the location of the mobile radio device, via GPS information or the like. The server may execute the channel selection function 74 to identify polygon area information and associated channel list information based on the location of the mobile radio device. Such information may be transmitted to the mobile radio device over the network 94. Based on this received information, the mobile radio device may then execute the channel selection application 206 to determine when a channel handover or transition is to occur. For example, executing the channel selection application 206 may result in performing the dot product calculation referenced above to determine whether the mobile radio device has crossed a polygon operating area boundary.

In exemplary embodiments, therefore, the server stores polygon operating area information and related channel list information. Such information is then transmitted to the mobile radio device. The channel selection and handover determinations are then made locally in the mobile radio device. Such a configuration has proven efficient, although alternatively the server can perform the channel selection and handover determinations and transmit a channel selection to the mobile radio device.

In accordance with the above, the network interface 208 of the mobile radio device 98 receives polygon operating area information for a plurality of polygon operating areas in which the mobile radio device may engage in wireless communication, wherein each of the polygon operating areas overlaps with at least one other of the polygon operating areas. The device locator 214 determines a location of the mobile radio device, and the controller 200 executes the channel selection application 206 that is stored in a memory 204. By execution of the channel selection application, the controller is configured to process the polygon operating area information to: determine a first polygon operating area in which the mobile radio device is located; select a first channel of operation corresponding to a channel that is available for use within the first polygon operating area; determine whether the mobile radio device has crossed a boundary of the first polygon operating area and entered a second polygon operating area; and when it is determined that the mobile radio device has crossed the boundary of the first polygon operating area and entered the second polygon operating area, select a second channel of operation area.

On the server 72 side, the server memory 80 stores the database 76 of polygon operating area information for a plurality of polygon operating areas in which the mobile radio device may engage in wireless communication, wherein each of the polygon operating areas overlaps with at least one other of the polygon operating areas. The server, via the communications interface 86, transmits the polygon operating area information to the mobile radio device, which then may perform the channel selection operations as described above. Alternatively, the server may determine device location and perform the channel selection operations, and then transmit the channel selections to the mobile radio device over the communications interface. As referenced above, however, it has proven more efficient to perform the boundary crossing calculations and resultant channel selections by the controller of the mobile radio device.

In accordance with the above, an aspect of the invention is a mobile radio device. In exemplary embodiments, the mobile radio device includes a network interface that receives polygon operating area information for a plurality of polygon operating areas in which the mobile radio device may engage in wireless communication, wherein each of the polygon operating areas overlaps with at least one other of the polygon operating areas. A device locator determines a location of the mobile radio device. A controller executes a channel selection application that is stored in a memory and, by execution of the channel selection application, the controller is configured to process the polygon operating area information to: determine a first polygon operating area in which the mobile radio device is located; select a first channel of operation corresponding to a channel that is available for use within the first polygon operating area; determine whether the mobile radio device has crossed a boundary of the first polygon operating area and entered a second polygon operating area; and when it is determined that the mobile radio device has crossed the boundary of the first polygon operating area and entered the second polygon operating area, select a second channel of operation corresponding to a channel that is available for use within the second polygon operating area.

In an exemplary embodiment of the mobile radio device, the polygon operating area information comprises, for each of the polygon operating areas, polygon boundary information and channel list information of channels that are available for wireless communication within a respective polygon operating area.

In an exemplary embodiment of the mobile radio device, the controller executes the channel selection application to determine: a location vector from the device location to a point on a boundary line segment of the first polygon operating area; and a boundary vector that is a vector normal to the boundary line segment; wherein it is determined whether the mobile radio device has crossed the boundary of the first polygon operating area based on a dot product of the location vector and the boundary vector.

In an exemplary embodiment of the mobile radio device, it is determined that the mobile radio device has crossed the boundary of the first polygon operating area when there is a sign change in the dot product of the location vector and the boundary vector.

In an exemplary embodiment of the mobile radio device, the controller executes the channel selection application to determine whether the mobile radio device has moved outside of the plurality of polygon operating areas, and if so, the controller causes the mobile radio device to idle.

In an exemplary embodiment of the mobile radio device, the controller executes the channel selection application to determine whether the mobile radio device has entered one of the plurality of polygon operating areas, and if so, the controller selects a channel of operation corresponding to a channel that is available for use within the entered polygon operating area.

Another aspect of the invention is a wireless communications server. In exemplary embodiments, the wireless communications server includes a memory that stores a database of polygon operating area information for a plurality of polygon operating areas in which a mobile radio device may engage in wireless communication, wherein each of the polygon operating areas overlaps with at least one other of the polygon operating areas. A communications interface transmits the polygon operating area information to the mobile radio device, wherein a channel handover selection is made for the mobile radio device based on the polygon operating area information.

In an exemplary embodiment of the wireless communications server, the wireless communications server further includes an input interface that is configured to receive an input of the polygon operating area information.

In an exemplary embodiment of the wireless communications server, the polygon operating area information comprises, for each of the polygon operating areas, polygon boundary information and channel list information of channels that are available for wireless communication within a respective polygon operating area.

In an exemplary embodiment of the wireless communications server, the communications interface includes a device locator for determining a location of the mobile radio device, and the wireless communications server further includes a processor that executes a channel selection function that is stored in a memory and, by execution of the channel selection function, the processor is configured to process the polygon operating area information to: determine a first polygon operating area in which the mobile radio device is located; select a first channel of operation corresponding to a channel that is available for use within the first polygon operating area; determine whether the mobile radio device has crossed a boundary of the first polygon operating area and entered a second polygon operating area; and when it is determined that the mobile radio device has crossed the boundary of the first polygon operating area and entered a second polygon operating area, select a second channel of operation corresponding to a channel that is available for use within the second polygon operating area; wherein the selections of the first channel and the second channel are transmitted to the mobile radio device.

In an exemplary embodiment of the wireless communications server, the processor executes the channel selection function to determine: a location vector from the device location to a point on a boundary line segment of the first polygon operating area; and a boundary vector that is a vector normal to the boundary line segment; wherein it is determined whether the mobile radio device has crossed the boundary of the first polygon operating area based on a dot product of the location vector and the boundary vector.

In an exemplary embodiment of the wireless communications server, it is determined that the mobile radio device has crossed the boundary of the first polygon operating area when there is a sign change in the dot product of the location vector and the boundary vector.

Another aspect of the invention is a method of performing a channel handover selection in a mobile radio device. In exemplary embodiments, the method of performing a channel handover selection includes the steps of: receiving polygon operating area information for a plurality of polygon operating areas in which the mobile radio device may engage in wireless communication, wherein each of the polygon operating areas overlaps with at least one other of the polygon operating areas; determining a location of the mobile radio device; determining a first polygon operating area in which the mobile radio device is located; selecting a first channel of operation corresponding to a channel that is available for use within the first polygon operating area; determining whether the mobile radio device has crossed a boundary of the first polygon operating area and entered a second polygon operating area; and when it is determined that the mobile radio device has crossed the boundary of the first polygon operating area and entered a second polygon operating area, selecting a second channel of operation corresponding to a channel that is available for use within the second polygon operating area.

In an exemplary embodiment of the method of performing a channel handover selection, the polygon operating area information comprises, for each of the polygon operating areas, polygon boundary information and channel list information of channels that are available for wireless communication within a respective polygon operating area.

In an exemplary embodiment of the method of performing a channel handover selection, the method further includes: determining a location vector from the device location to a point on a boundary line segment of the first polygon operating area; determining a boundary vector that is a vector normal to the boundary line segment; and determining whether the mobile radio device has crossed the boundary of the first polygon operating area based on a dot product of the location vector and the boundary vector.

In an exemplary embodiment of the method of performing a channel handover selection, the method further includes determining whether the mobile radio device has moved outside of the plurality of polygon operating areas, and if so, the idling the mobile radio device.

In an exemplary embodiment of the method of performing a channel handover selection, the method further includes determining whether the mobile radio device has entered one of the plurality of polygon operating areas, and if so, selecting a channel of operation corresponding to a channel that is available for use within the entered polygon operating area.

In an exemplary embodiment of the method of performing a channel handover selection, the method further includes storing the polygon operating area information on a server.

In an exemplary embodiment of the method of performing a channel handover selection, the polygon operating area information is received by the mobile radio device from the server over a network interface, and the mobile radio device performs the determining and channel selecting steps based on the polygon operating area information received from the server.

In an exemplary embodiment of the method of performing a channel handover selection, the server performs the determining and channel selecting steps based on the stored polygon operating area information, and the server transmits the channel selections to the mobile radio device over a network interface.

Although certain embodiments have been shown and described, it is understood that equivalents and modifications falling within the scope of the appended claims will occur to others who are skilled in the art upon the reading and understanding of this specification.

What is claimed is:

1. A mobile radio device comprising:
a network interface that receives polygon operating area information for two intersecting polygon operating areas in which the mobile radio device engages in wireless communication, wherein each of the polygon operating areas geographically overlaps with the other polygon operating area in a first portion of the polygon operating area and does not geographically overlap with the other polygon operating area in a second portion of the polygon operating area, and each polygon operating area having a different set of one or more available operating channels for use within the polygon operating area; and
a controller that executes a channel selection application that is stored in a memory and, by execution of the channel selection application, the controller is configured to process the polygon operating area information to determine operating channels for conducting wireless communications while the mobile radio device travels through each of the portions of the polygon operating areas, including:
determine a first of the two polygon operating areas in which the mobile radio device is located;
select a first channel of operation from the set channels available for use within the first polygon operating area;
determine that the mobile radio device has left the overlapping portions of the polygon operating areas by crossing a boundary of the first polygon operating area and remaining in a second of the two polygon operating areas; and
in response to the determination that the mobile radio device has left the overlapping areas, select a second channel of operation from the set of channels available for use within the second polygon operating area; and
wherein determination that the mobile radio device has left the overlapping areas includes determining:
a location vector from a current device location to a point on a boundary line segment of the first polygon operating area;
a boundary vector that is a vector normal to the boundary line segment; and
a sign change in a dot product of the location vector and the boundary vector.

2. The mobile radio device of claim 1, wherein execution of the channel selection application is further configured to determine that the mobile radio device has moved outside of the polygon operating areas and cause wireless communications of the mobile radio device to idle.

3. The mobile radio device of claim 2, wherein, during the idling of the wireless communications, the controller executes the channel selection application to determine that the mobile radio device has entered one of the polygon operating areas and select a channel of operation corresponding to a channel that is available for use within the entered polygon operating area.

4. A wireless communications server comprising:
a memory that stores a database of polygon operating area information for a plurality of polygon operating areas surrounding a location of a mobile radio device that carriers out wireless communications, wherein each of the polygon operating areas overlaps with at least one other adjacent polygon operating area and each adjacent polygon operating area having a different set of one or more available operating channels for use within the polygon operating area; and
a communications interface that transmits channel selections for carrying out wireless communications to the mobile radio device, wherein the channel selections are made by:
determine a first of the polygon operating areas in which the mobile radio device is located;
select a first channel of operation from the set of channels available for use within the first polygon operating area;
determine that the mobile radio device has left an overlapping area of the first polygon operating area and a second polygon operating area by crossing a boundary of the first polygon operating area and remaining in the second polygon operating area; and
in response to the determination that the mobile radio device has left the overlapping area, select a second channel of operation from the set of channels available for use within the second polygon operating area; and
wherein determination that the mobile radio device has left the overlapping area includes determining:
a location vector from a current device location to a point on a boundary line segment of the first polygon operating area;
a boundary vector that is a vector normal to the boundary line segment; and
a sign change in a dot product of the location vector and the boundary vector.

5. A method of performing a channel selection for conducting wireless communications in a mobile radio device comprising the steps of:
receiving polygon operating area information for a plurality of polygon operating areas surrounding a location of the mobile radio device, wherein each of the polygon operating areas overlaps with at least one other adjacent polygon operating area and each adjacent polygon operating area having different set of one or more available operating channels for use within the polygon operating area;
determining a first of the polygon operating areas in which the mobile radio device is located;
selecting a first channel of operation from the set of channels available for use within the first polygon operating area;
determining that the mobile radio device has left an overlapping area of the first polygon operating area and a second polygon operating area by crossing a boundary of the first polygon operating area and remaining in the second polygon operating area; and
in response to the determination that the mobile radio device has left the overlapping area, selecting a second channel of operation from the set of channels available for use within the second polygon operating area; and
wherein the determining that the mobile radio device has left the overlapping areas includes determining:
determining a location vector from the device location to a point on a boundary line segment of the first polygon operating area;
determining a boundary vector that is vector normal to the boundary line segment; and
determining a sign change in a dot product of the location vector and the boundary vector.

6. The method of performing a channel selection of claim 5, further comprising determining that the mobile radio device has moved outside of the plurality of polygon operating areas and idling wireless communications of the mobile radio device.

7. The method of performing a channel selection of claim 6, further comprising, during the idling, determining that the mobile radio device has entered one of the plurality of polygon operating areas and selecting a channel of operation corresponding to a channel that is available for use within the entered polygon operating area.

8. The method of performing a channel selection of claim 5, wherein the polygon operating area information is received by the mobile radio device from a server over a network interface.

* * * * *